US009063616B2

(12) United States Patent
Yu

(10) Patent No.: US 9,063,616 B2
(45) Date of Patent: Jun. 23, 2015

(54) OPTICAL TOUCH DEVICE WITH SYMMETRIC LIGHT SOURCES AND LOCATING METHOD THEREOF

(75) Inventor: Joe Yu, New Taipei (TW)

(73) Assignee: UC-Logic Technology Corp. (TW)

( * ) Notice: Subject to any disclaimer, the term of this patent is extended or adjusted under 35 U.S.C. 154(b) by 334 days.

(21) Appl. No.: 13/506,138

(22) Filed: Mar. 29, 2012

(65) Prior Publication Data
US 2012/0306820 A1    Dec. 6, 2012

(30) Foreign Application Priority Data

Jun. 2, 2011   (TW) .............................. 100119423 A
Jul. 1, 2011   (TW) .............................. 100123310 A

(51) Int. Cl.
*G06F 3/042*    (2006.01)
(52) U.S. Cl.
CPC ..................................... *G06F 3/0421* (2013.01)
(58) Field of Classification Search
CPC .............. G06F 3/0421–3/0423; G06F 3/0428; G06F 2203/04109
USPC .................................................... 345/173–178
See application file for complete search history.

(56) References Cited

U.S. PATENT DOCUMENTS

| 6,229,529 | B1 * | 5/2001 | Yano et al. ..................... 345/175 |
| 6,823,481 | B2 * | 11/2004 | Takekawa ........................ 714/48 |
| 7,113,174 | B1 | 9/2006 | Takekawa et al. |
| 8,890,848 | B2 | 11/2014 | Yu |
| 2001/0002694 | A1 | 6/2001 | Nakazawa et al. |
| 2001/0028344 | A1 * | 10/2001 | Iwamoto et al. ............... 345/175 |
| 2001/0055006 | A1 * | 12/2001 | Sano et al. ...................... 345/175 |
| 2002/0145595 | A1 * | 10/2002 | Satoh ............................. 345/173 |
| 2003/0206306 | A1 * | 11/2003 | Omura et al. .................. 356/620 |
| 2005/0264541 | A1 | 12/2005 | Satoh |
| 2008/0143690 | A1 * | 6/2008 | Jang et al. ...................... 345/175 |
| 2009/0244018 | A1 | 10/2009 | Lin et al. |
| 2010/0328243 | A1 | 12/2010 | Wang et al. |
| 2011/0050649 | A1 * | 3/2011 | Newton et al. ................. 345/175 |
| 2011/0074674 | A1 * | 3/2011 | Walberg et al. ............... 345/158 |
| 2011/0163996 | A1 | 7/2011 | Wassvik et al. |

FOREIGN PATENT DOCUMENTS

TW    201030578 A    8/2010
TW    201035836 A    10/2010

OTHER PUBLICATIONS

Notice of Allowance mailed Jul. 18, 2014, from U.S. Appl. No. 13/797,748 (11 pages).

* cited by examiner

*Primary Examiner* — Sanghyuk Park
(74) *Attorney, Agent, or Firm* — Kilpatrick Townsend & Stockton LLP

(57) ABSTRACT

In an optical touch device and locating method thereof, light sensor modules are mounted on a panel body. Each light sensor module includes an array of light sensors each assigned with an individual index corresponding to angle information thereof. A look-up table includes the angle information corresponding to the indexes assigned respectively to the light sensors of the light sensor modules. A processing unit receives from each light sensor module a number of sensing signals generated by a series of the light sensors in response to touching of an object in a touch area of the panel body, and determines a position of a touch point of the object in the touch area based on the sensing signals from the light sensor modules, and the look-up table.

16 Claims, 9 Drawing Sheets

OPTICAL TOUCH DEVICE WITH SYMMETRIC LIGHT SOURCES AND LOCATING METHOD THEREOF

CROSS-REFERENCE TO RELATED APPLICATION

This application claims priority to Taiwanese Application Nos. 100119423 and 100123310, filed on Jun. 2, 2011, and Jul. 1, 2011, respectively.

BACKGROUND OF THE INVENTION

1. Field of the Invention

The invention relates to a touch device, and more particularly to an optical touch device and locating method thereof.

2. Description of the Related Art

Referring to FIG. 1, a conventional optical detection system disclosed in Taiwanese Patent Publication No. 201030578 is shown to include a processing unit (not shown), and two modules 11, 12 respectively oriented toward a detection area 10 and disposed respectively at an upper right corner and an upper left corner of the detection area 10. Each of the modules 11, 12 includes a detection unit 111, 121. The detection unit 111 includes a guiding lens 112 with a focus (F), and a detector 113. The detection unit 121 includes a guiding lens 122 with a focus (F), and a detector 123. Each of the guiding lenses 112, 122 has an axis 115, 125. A distance (S) is formed between centers 114, 124 of the guiding lens 112, 122 and is equal to the length of a line 13. An included angle ($\theta_1$) is formed between an axis 115 of the guiding lens 112 and the line 13. An included angle ($\theta_2$) is formed between an axis 125 of the guiding lens 122 and the line 13.

When an object 2 touches the detection area 10, the object 2 reflects part of light from a light-generating unit (not shown) into two reflected lights 21, 22. The reflected lights 21, 22 respectively pass through the guiding lenses 112, 122, thereby forming respectively two images 23, 24 on the detectors 113, 123. An included angle ($\Delta\theta_1$) is formed between the axis 115 and the reflected light 21. An included angle ($\Delta\theta_2$) is formed between the axis 125 and the reflected light 22. The image 23 is formed at a position away from an intersection point of the detector 113 and the axis 115 by a distance ($\Delta L_1$). The image 24 is formed at a position away from an intersection point of the detector 123 and the axis 125 by a distance ($\Delta L_2$). Thus, the processing unit obtains an included angle ($\beta_1$) formed between the reflected light 21 and the line 13, and an included angle ($\beta_2$) formed between the reflected light 22 and the line 13 using the following Equations (1) and (2):

$$\Delta\theta_n = \arctan\left(\frac{\Delta L_n}{F}\right) \quad (1)$$

$$\beta_n = \theta_n - \Delta\theta_n, \quad (2)$$

where n=1, 2. Thereafter, the processing unit can determine a touch location of the object 2 in the detection area 10 based on $\beta_1$, $\beta_2$ and S.

However, for such a configuration, it is required to compute inverse trigonometric functions and then proceed triangulation computation, thereby resulting in relatively complicated computation. Therefore, improvements may be made to the above techniques.

SUMMARY OF THE INVENTION

Therefore, an object of the present invention is to provide an optical touch device and locating method thereof that can overcome the aforesaid drawbacks of the prior art.

According to one aspect of the present invention, there is provided a locating method for an optical touch device. The optical touch device includes a panel body having a side surface configured with a touch area, a number (I) of light sensor modules mounted symmetrically on the side surface of the panel body and disposed out of the touch area, and a processing unit connected electrically to the light sensor modules. Each of the light sensor modules includes an array of light sensors, each of which is operable to generate a sensing signal in response to a specific intensity of light sensed thereby. The locating method comprises the steps of:

a) for each of the light sensor modules, assigning to each of the light sensors an individual index corresponding to angle information thereof;

b) establishing a look-up table that includes the angle information corresponding to the indexes assigned respectively to the light sensors of the light sensor modules;

c) when a first object contacts the touch area of the panel body, configuring the processing unit to determine, for each of the light sensor modules, based on a number (N1_i) of sensing signals from a corresponding one of the light sensor modules generated respectively by a first series (S1_i) of the light sensors of the corresponding one of the light sensor modules in response to sensing of light associated with the first object, a first candidate index that is associated with the indexes assigned respectively to the first series (S1_i) of the light sensors of the corresponding one of the light sensor modules, where i=1, . . . , I;

d) configuring the processing unit to obtain, from the look-up table established in step b), the angle information corresponding to the first candidate indexes for the light sensor modules determined in step c); and e) configuring the processing unit to determine a position of a touch point of the first object in the touch area of the panel body based on the angle information obtained in step d).

According to another aspect of the present invention, an optical touch device comprises:

a panel body having a side surface configured with a touch area, and a peripheral area surrounding the touch area;

a number (I) of light sensor modules mounted to the peripheral area of the side surface of the panel body, each of the light sensor modules including an array of light sensors, each of the light sensors of each of the light sensor modules being assigned with an individual index corresponding to angle information thereof, and being operable to generate a sensing signal in response to a specific intensity of light sensed thereby;

a memory for storing a look-up table that includes the angle information corresponding to the indexes assigned respectively to the light sensors of the light sensor modules; and a processing unit connected electrically to the light sensor modules and the memory.

When a first object contacts the touch area of the panel body, for each of the light sensor modules, a first series (S1_i) of the light sensors generate respectively a number (N1_i) of sensing signals in response to sensing of light associated with the first object, and output the number (N1_i) of the sensing signals to the processing unit such that the processing unit is operable to determine, for each of the light sensor modules, based on the number (N1_i) of the sensing signals from a corresponding one of the light sensor modules, a first candidate index that is associated with the indexes assigned respectively to the first series ($S1\_i$) of the light sensors of the corresponding one of the light sensor modules, where $i=1, \ldots, I$.

The processing unit is operable to obtain, from the look-up table stored in the memory, the angle information corresponding to the first candidate indexes for the light sensor modules and to determine a position of a touch point of the first object in the touch area of the panel body based on the angle information obtained thereby.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
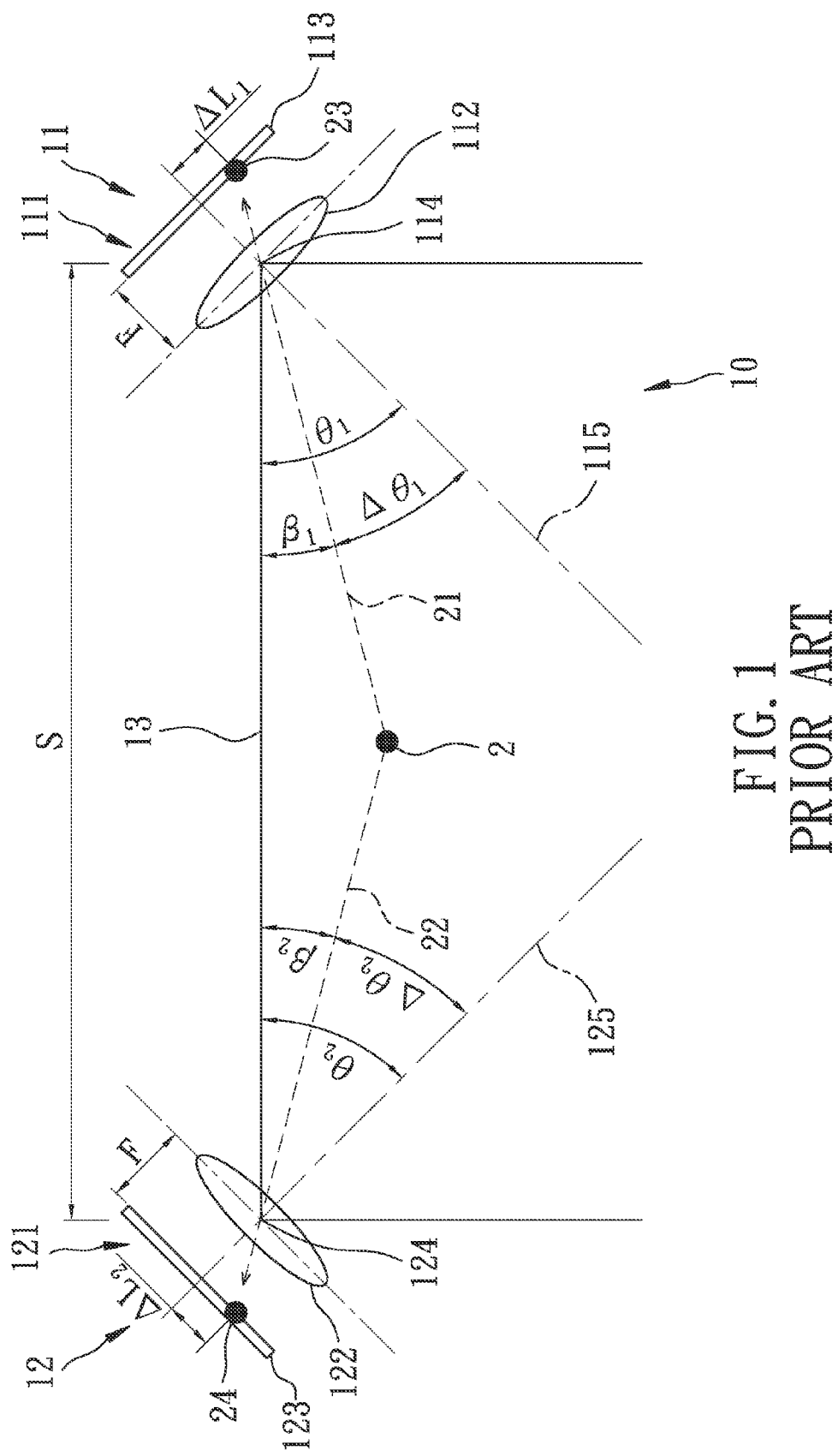
FIG. 1 is a schematic view showing a conventional optical detection system.
Figure 2:
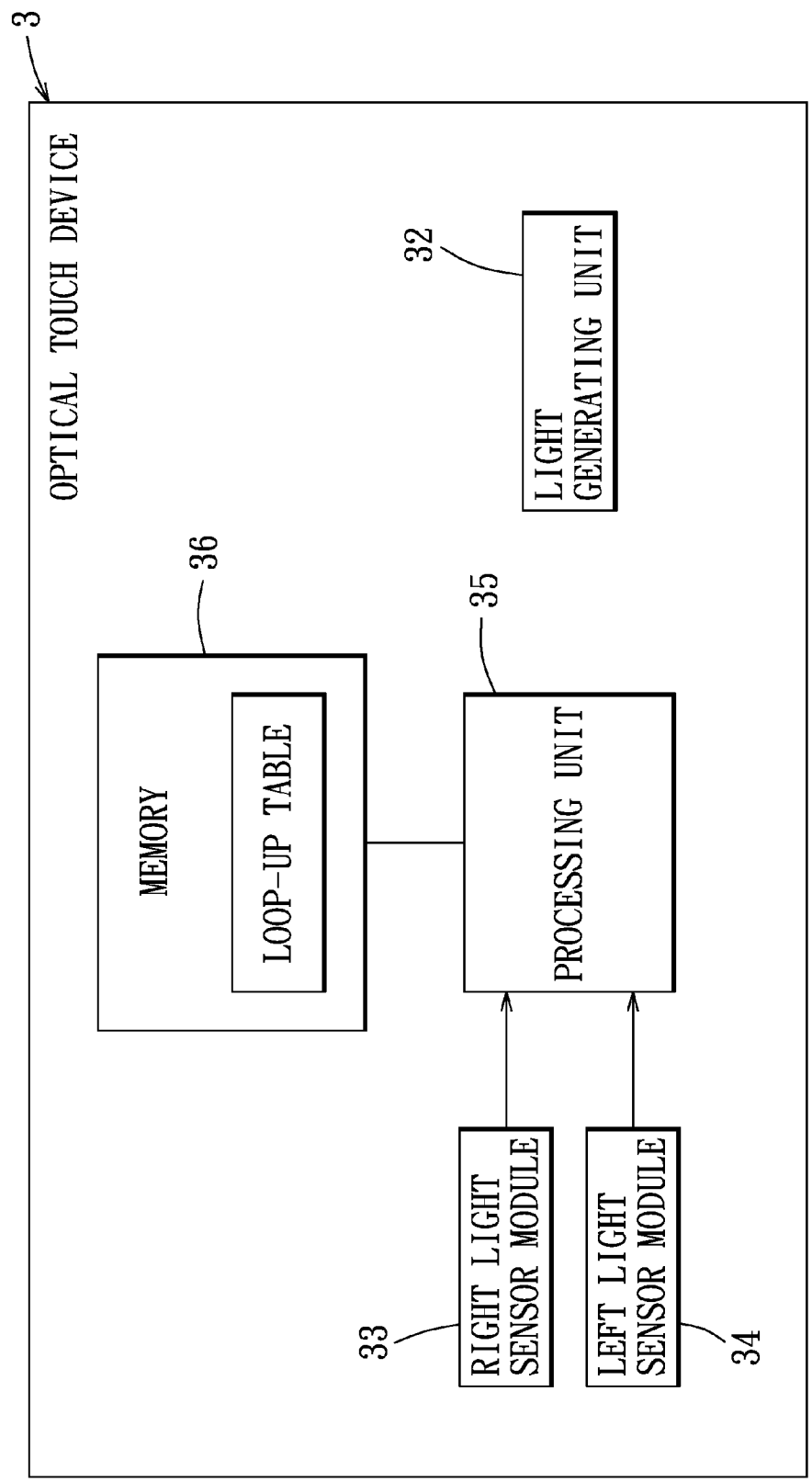
FIG. 2 is a schematic circuit block diagram illustrating the preferred embodiment of an optical touch device according to the present invention.
Figure 3:
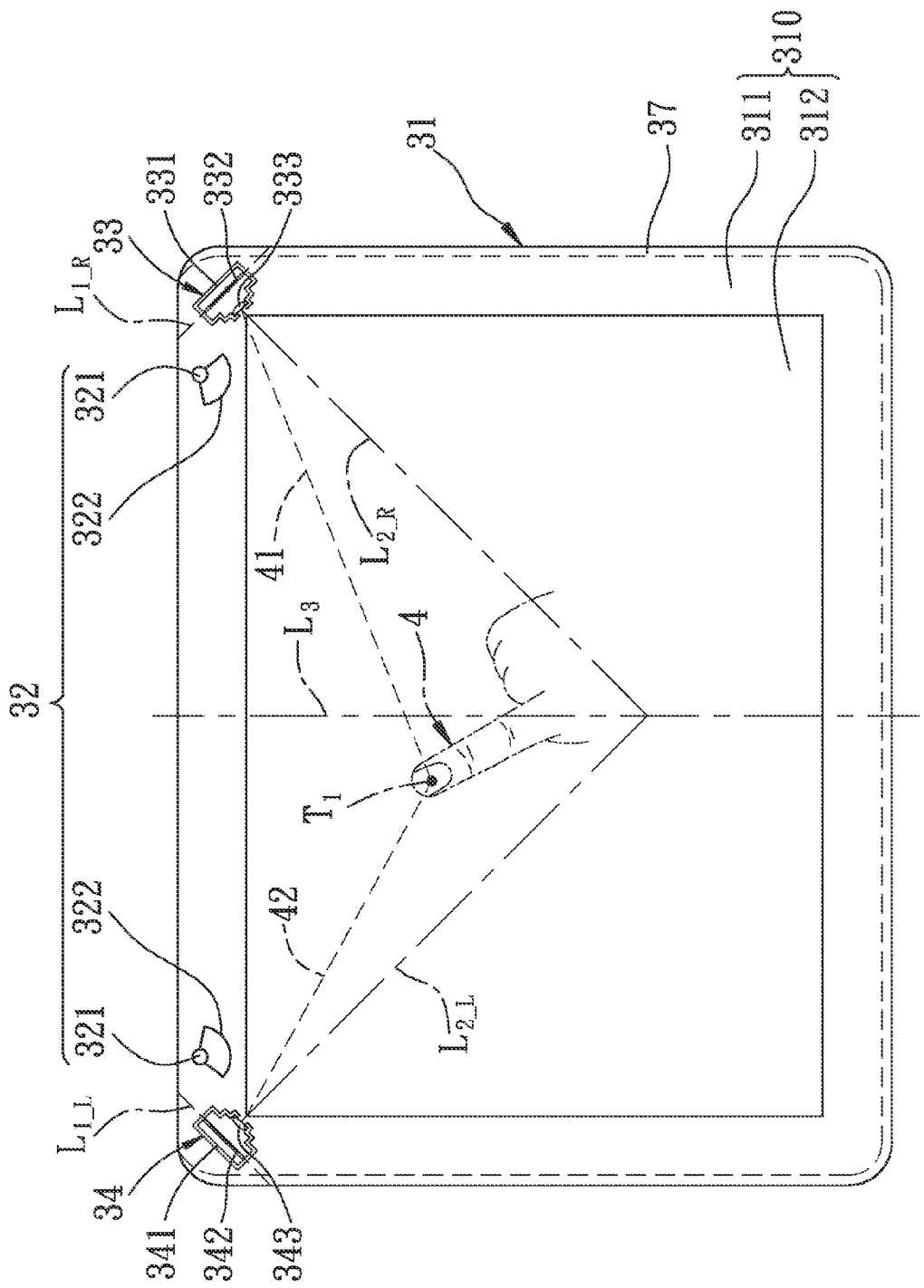
FIG. 3 is a schematic view showing the preferred embodiment when a user's finger contacts a touch area of a panel body.

Referring to FIGS. 2 and 3, the preferred embodiment of an optical touch device 3 according to the present invention is shown to include a panel body 31, a light generating unit 32, a number (I) of light sensor modules, a processing unit 35, and a memory 36.

The panel body 31 has a side surface 310 configured with a rectangular touch area 312, and a peripheral area 311 surrounding the touch area 312.

Figure 4:
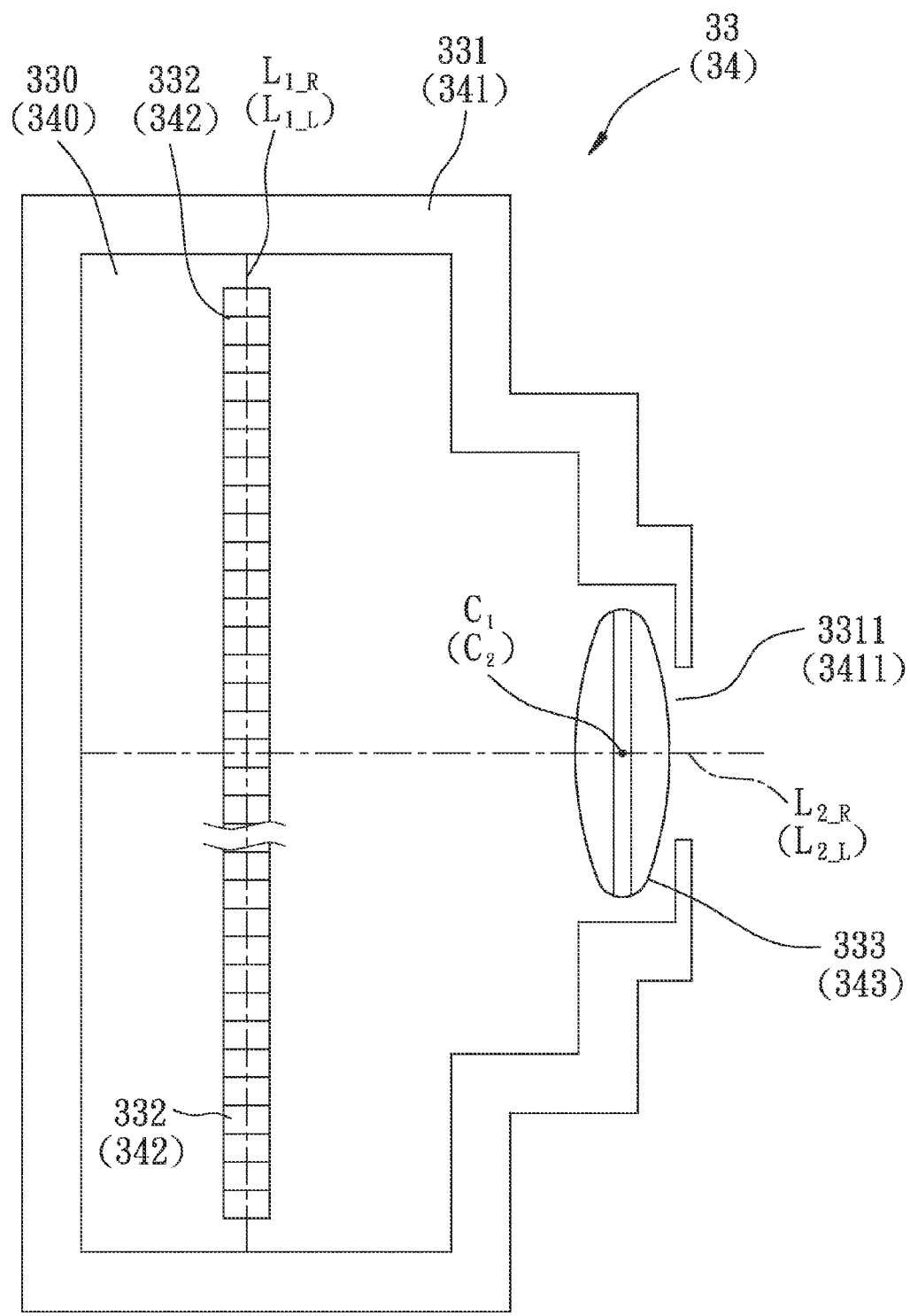
FIG. 4 is a schematic view showing a light sensor module of the preferred embodiment.

In this embodiment, I=2, i.e., one light sensor module serves as a right light sensor module 33, and the other light sensor module serves as a left light sensor module 34. The right and left light sensor modules 33, 34 are mounted to the peripheral area 311 of the side surface 310, and are disposed respectively adjacent to an upper right corner and an upper left corner of the touch area 312. It is noted that the right and left light sensor modules 33, 34 are symmetrical relative to a vertical central line ($L_3$) of the touch area 312, as shown in FIG. 3. Referring further to FIG. 4, the right and left light sensor modules 33, 34 have the same configuration. Each of the right and left light sensor modules includes a casing 331, 341 an array of light sensors 332, 342, each operable to generate a sensing signal in response to a specific intensity of light sensed thereby, and a guiding lens 333, 343. The casing 331, 341 is configured with a receiving space 330, 340 for receiving the array of the light sensors 332, 342 and the guiding lens 333, 334 therein, and is formed with an opening 3311, 3411 in spatial communication with the receiving space 330, 340. The array of light sensors 332, 342 are arranged along a first axial line ($L_{1\_R}$, $L_{1\_L}$), and are symmetrical relative to a second axial line ($L_{2\_R}$, $L_{2\_L}$) orthogonal to the first axial line ($L_{1\_R}$, $L_{1\_L}$). The guiding lens 333, 343 is disposed parallel to the array of the light sensors 332, 342 and adjacent to the opening 3311, 3411 in the casing 330, 340. The guiding lens 333, 343 has an axial center ($C_1$, $C_2$) located on the second axial line ($L_{2\_R}$, $L_{2\_L}$). Furthermore, the second axial lines ($L_{2\_R}$, $L_{2\_L}$) for the right and left light sensor modules 33, 34 are orthogonal to each other (see FIG. 3), and the second axial lines ($L_{2\_R}$, $L_{2\_L}$) and the vertical central line ($L_3$) intersect at one point (see FIG. 3). A distance (D) is formed between the axial centers ($C_1$, $C_2$) of the guiding lenses 333, 343 of the right and left light sensor modules 33, 34. It is noted that each of the light sensors 332, 342 is assigned with an individual index corresponding to angle information thereof, for example a tangent value of an angle associated therewith.

Figure 5:
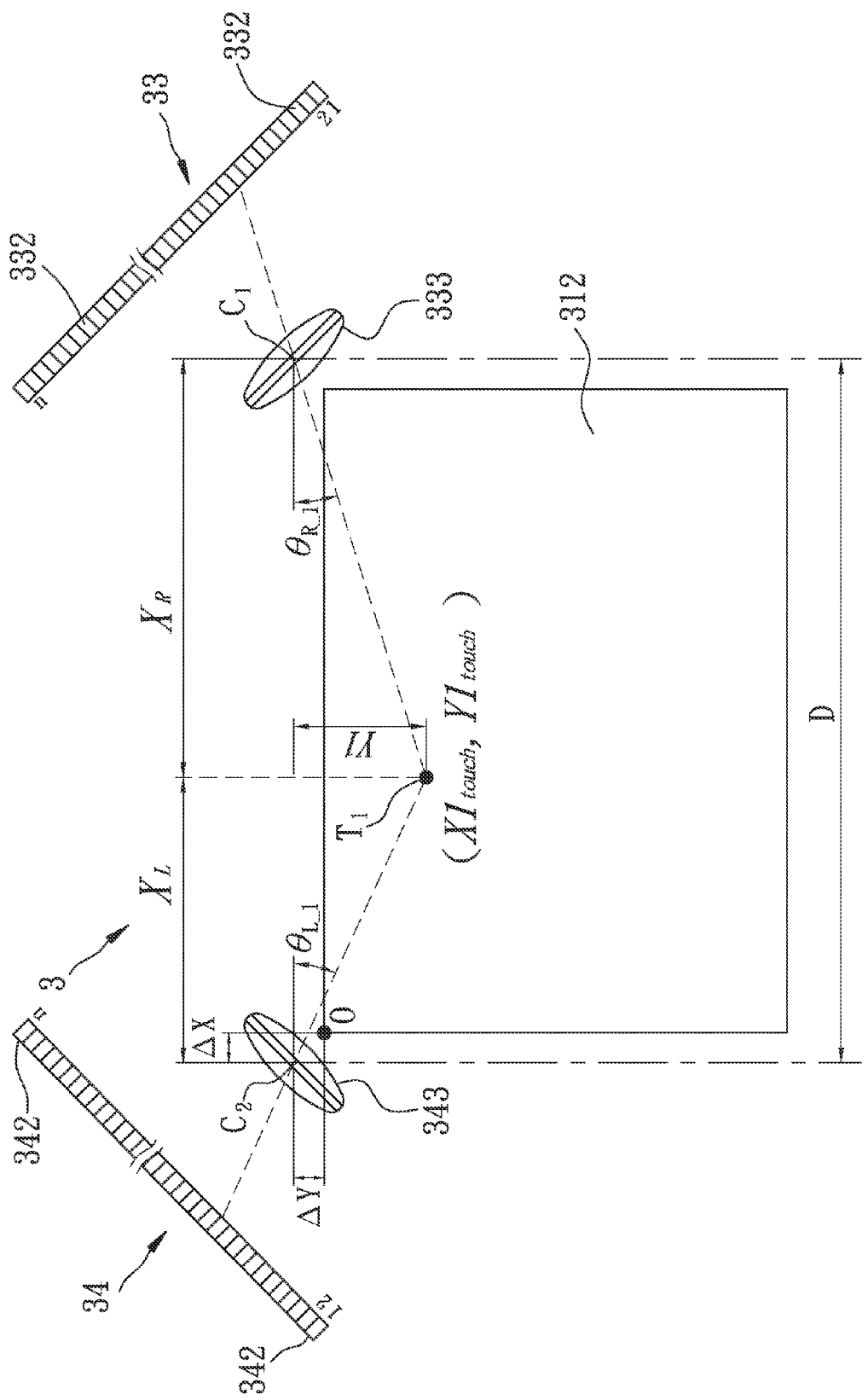
FIG. 5 is a schematic view illustrating how a two-dimensional coordinate of a position of a touch point of the user's finger in the touch area is determined by the preferred embodiment.

In this embodiment, each of the light sensors 332, 342 is operable between an active state, where a sensing signal is generated, and a non-active state In this embodiment, for each of the right and left light sensor modules 33, 34, the indexes assigned respectively to the light sensors 332, 342 are consecutive integers, for example, 1, 2, ..., n (see FIG. 5).

The memory 36 stores a look-up table that includes the angle information corresponding to the indexes assigned respectively to the light sensors 332, 342 of the right and left light sensor modules 33, 34. In this embodiment, the look-up table includes first and second sub-tables corresponding respectively to the right and left light sensor modules 33, 34, as shown in Tables 1 and 2 below. The first and second sub-tables are similar to each other. Each of the first and second sub-tables includes the angle information corresponding to the indexes assigned respectively to the light sensors 332, 342 of a respective one of the right and left light sensor modules 33, 34.

TABLE 1

| Index | Angle information |
| --- | --- |
| 1 | $\tan \theta_1$ |
| 2 | $\tan \theta_2$ |
| . | . |
| . | . |
| . | . |
| n | $\tan \theta_n$ |

TABLE 2

| Index | Angle information |
| --- | --- |
| 1 | $\tan \theta_1$ |
| 2 | $\tan \theta_2$ |
| . | . |
| . | . |
| . | . |
| n | $\tan \theta_n$ |

The light generating unit 32 is mounted to the peripheral area 311 of the side surface 310 of the panel body 31 for generating light, for example infrared light, that propagates along the side surface 310 of the panel body 31 and enters into the touch area 312 of the panel body 31. In this embodiment, the light generating unit 32 includes two light sources 321 disposed respectively adjacent to the right and left light sensor modules 33, 34 (see FIG. 3) for emitting a light beam, and two light converting lens 322 each disposed in front of a corresponding light source 321 for converting the light beam emitted by the corresponding light source 321 into a sheet of light entering into the touch area 312. In addition, a light absorption member 37 is made of a light absorbing and non-reflective material, and is disposed in the peripheral area 311 to surround lateral sides and a lower side of the touch area 312.

The processing unit 35 is connected electrically to the right and left light sensor modules 33, 34, and the memory 36.

In use, when a single object, serving as a first object 4, for example a user's finger, contacts the touch area 312 of the panel body 310, the sheets of light from the light generating unit 32 are for intercepted and guided by the first object 4 to thus produce first and second reflected lights 41, 42 passing respectively through the guiding lenses 333, 343 of the right and left light sensor modules 33, 34 via the openings 3311, 3411 in the casings 331, 341 and toward the array of the light sensors 332, 342, as shown in FIG. 3. In this case, for each of the right and left light sensor modules 33, 34, a first series (S1_1, S1_2) of the light sensors 332, 342 are operated in the active state to thus generate respectively a number (N1_1, N1_2) of sensing signals in response to a corresponding one of the first and second reflected lights 41, 42, and output the number (N1_1, N1_2) of the sensing signals to the processing unit 35. In addition, the remaining light sensors 332, 342 are operated in the non-active state. As a result, the processing unit 35 receives from the right light sensor module 33 the number (N1_1) of the sensing signals, which are generated respectively by the first series (S1_1) of the light sensors 332, and receives from the left light sensor module 34 the number (N1_2) of the sensing signals, which are generated respectively by the first series (S1_2) of the light sensors 342. Thus, the processing unit 35 is operable to determine, for each of the right and left light sensor modules 33, 34, based on the number (N1_1, N1_2) of the sensing signals from a corresponding one of the right and left light sensor modules 33, 34, a first candidate index (Index1$_R$, Index1$_L$) that is associated with the indexes assigned respectively to the first series (S1_1, S1_2) of the light sensors 332, 342 of the corresponding one of the right and left light sensor modules 33, 34.

In this embodiment, when each of the numbers (N1_1, N1_2) is greater than one, for each of the right and left light sensor modules 33, 34, the processing unit 35 determines an integral number equal to or closest to and greater than and greater than an average of the indexes assigned respectively to first and last ones of the first series (S1_1, S1_2) of the light sensors 332, 342 as the first candidate index. Alternatively, when the number (N1_1) or (N1_2) is equal to one, the processing unit 35 determines, for the right or left light sensor module 33 or 34, the index assigned to a corresponding light sensor 332 or 342 generating the sensing signal as the first candidate index (Index1$_R$ or Index1$_L$). For example, if N1_1=p, N1_2=k, the indexes assigned respectively to the first series (S1_1) of the light sensors 332 of the right light sensor module 33 are denoted as i+1, i+2, ..., and i+p, and the indexes assigned respectively to the first series (S1_2) of the light sensors 342 of the left light sensor module 34 are denoted as j+1, j+2, ..., and j+k, the first candidate indexes (Index1$_R$, Index1$_L$) for the right and left light sensor module 33, 34 can be represented by the following Expressions (1) and (2):

$$Index1_R = \frac{(i+1)+(i+p)}{2}\left(=i+\frac{p+1}{2}\right), \text{ if } p \text{ is odd} \quad (1)$$
$$= i+1+\frac{p}{2}, \text{ if } p \text{ is even}$$

$$Index1_L = \frac{(j+1)+(j+k)}{2}\left(=j+\frac{k+1}{2}\right), \text{ if } k \text{ is odd} \quad (2)$$
$$= j+1+\frac{k}{2}, \text{ if } k \text{ is even}$$

Then, the processing unit 35 is operable to obtain, from the look-up table stored in the memory 36, the angle information corresponding to the first candidate indexes (Index1$_R$, Index1$_L$) for the right and left light sensor modules 33, 34 and to determine a position of a touch point (T$_1$) of the first object 4 in the touch area 312 of the panel body 31 based on the angle information obtained thereby. In this embodiment, the angle information obtained by the processing unit 35 includes tangent values (tan θ$_{R\_1}$, tan θ$_{L\_1}$) corresponding respectively to the first candidate indexes (Index1$_R$, Index1$_L$). Therefore, the processing unit 35 determines the position of the touch point (T$_1$) of the first object 4 based on the tangent values (tan θ$_{R\_1}$, tan θ$_{L\_1}$), and the distance (D).

More specifically, as shown in FIG. 5, the distance (D) is equal to a sum of an X-direction component (X$_{R\_1}$) of a distance between the touch point (T$_1$) of the first object 4 and the axial center (C$_1$) of the guiding lens 333 of the right light sensor module 33, and an X-direction component (X$_{L\_1}$) of a distance between the touch point (T$_1$) of the first object 4 and the axial center (C$_2$) of the guiding lens 343 of the left light sensor module 34. The processing unit 35 determines, based on the tangent values (tan θ$_{R\_1}$, tan θ$_{L\_1}$), the X-direction components (X$_{R\_1}$, X$_{L\_1}$) that can be represented by the following Expressions (3) and (4):

$$X_{R\_1} = \frac{\tan\theta_{L\_1} \times D}{\tan\theta_{R\_1} + \tan\theta_{L\_1}} \quad (3)$$

$$X_{L\_1} = D - X_{R\_1} \quad (4)$$

In addition, the processing unit 35 determines, based on the tangent values (tan θ$_{R\_1}$, tan θ$_{L\_1}$) and the X-direction components (X$_{R\_1}$, X$_{L\_1}$), an average (Y1) of a Y-direction component (Y$_{R\_1}$) of the distance between the touch point (T$_1$) of the first object 4 and the axial center (C$_1$) of the guiding lens 333 of the right light sensor module 33, and a Y-direction component (Y$_{L\_1}$) of the distance between the touch point (T$_1$) of the first object 4 and the axial center (C$_2$) of the guiding lens 343 of the left light sensor module 34. The Y-direction components (Y$_{R\_1}$, Y$_{L\_1}$) and the average (Y1) can be represented respectively by the following Expressions (5), (6) and (7):

$$Y_{R\_1} = \tan\theta_{R\_1} \times X_{R\_1} \quad (5)$$

$$Y_{L\_1} = \tan\theta_{L\_1} \times X_{L\_1} \quad (6)$$

$$Y1 = \frac{Y_{R\_1} + Y_{L\_1}}{2} \quad (7)$$

Thus, the processing unit 35 determines a related two-dimensional coordinate of the position of the touch point (T$_1$) of the first object 4 based on the X-direction component (X$_{L\_1}$) and the average (Y1). It is noted that the related two-dimensional coordinate is a two-dimensional coordinate relative to an origin located at the axial center ($C^2$) of the guiding lens 343 of the left light sensor module 34. As such, the related two-dimensional coordinate can be converted into an absolute two-dimensional coordinate ($X1_{touch}$, $Y1_{touch}$) for the touch area 312 relative to an origin (O) located at the upper left corner of the touch area 312. The absolute two-dimensional coordinate ($X1_{touch}$, $Y1_{touch}$) can be represented as ($X_{L\_1}$−$\Delta X$, Y1−$\Delta Y$), where $\Delta X$ is a distance between the origin (O) and the axial center ($C_2$) in the X direction, and $\Delta Y$ is a distance between the origin (O) and the axial center ($C_2$) in the Y direction.

Figure 6:
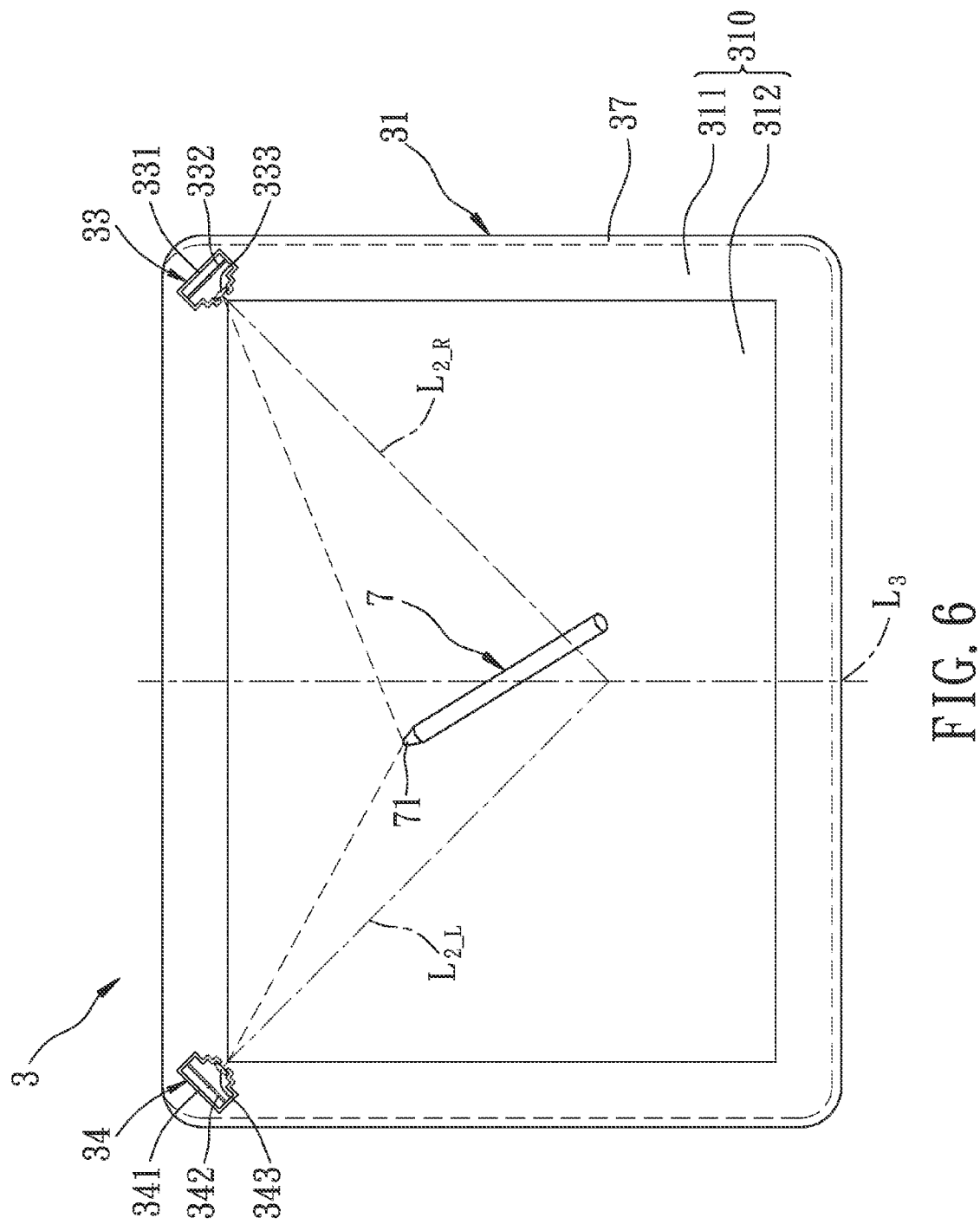
FIG. 6 is a schematic view showing a variation of the preferred embodiment.

FIG. 6 shows a variation of the preferred embodiment, wherein the light generating unit 32 is omitted. In this case, a touch pen 7 with a lighting stylus 71 must be used with the optical touch device 3. Therefore, when the touch pen 7 serving as the object contacts the touch area 312, the right and left light sensor modules 33, 34 sense light emitted by the lighting stylus 71 of the touch pen 7.

Figure 7:
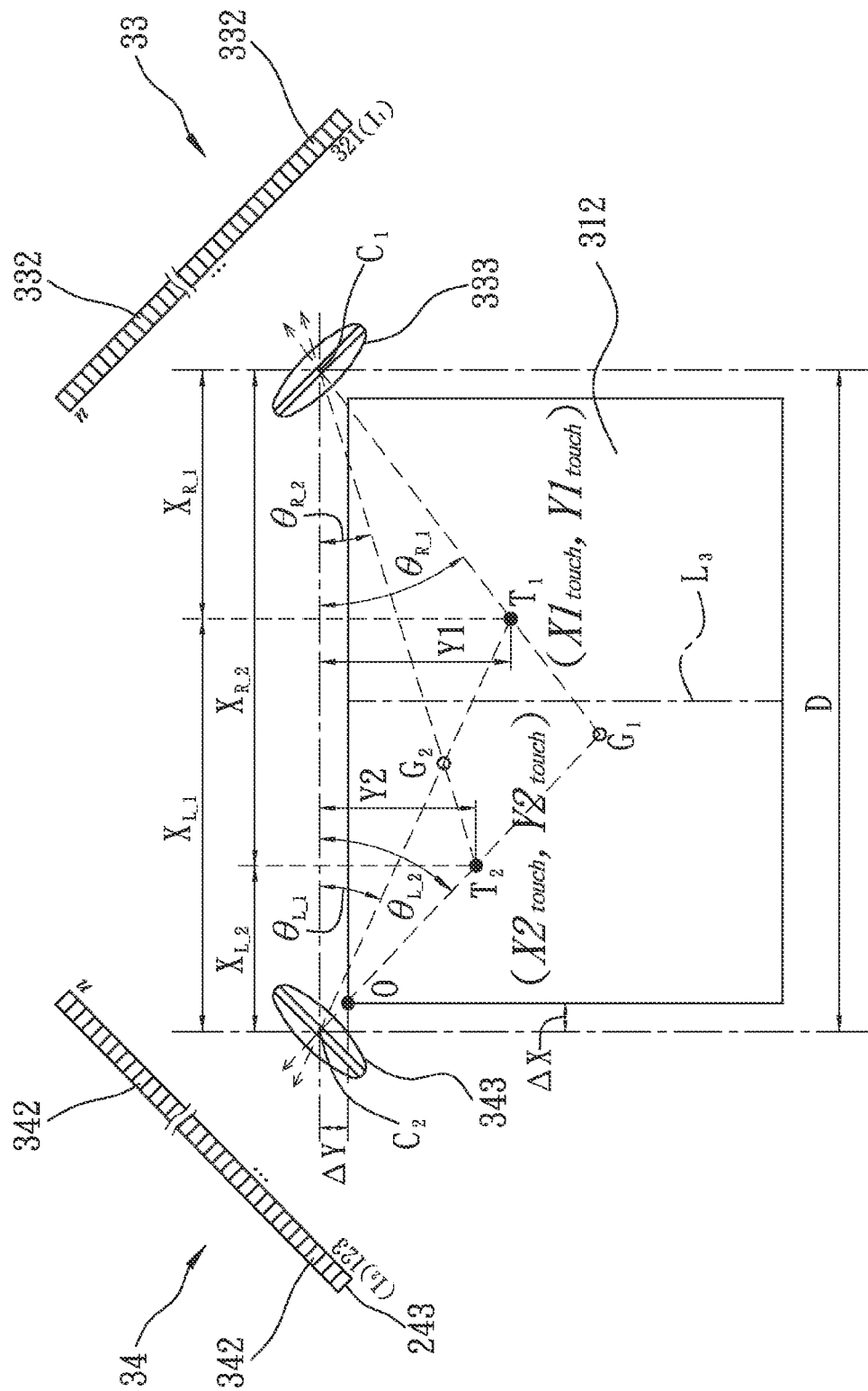
FIG. 7 is a schematic view illustrating an example of the preferred embodiment when in a two-touch operation.

FIG. 7 illustrates an example of the preferred embodiment when in a two-touch operation, where a second object contacts the touch area 312 simultaneously with the first object, wherein touch points of the first and second objects are denoted respectively by $T_1$ and $T_2$. In this case, for each of the right and left light sensor modules 33, 34, not only the first series (S1_1, S1_2) of the light sensors 33, 34 generate the number (N1_1, N1_2) of the sensing signal associated with the first object, but a second series (S2_1, S2_2) of the light sensors 332, 342 also generate a number (N2_1, N2_2) of sensing signals associated with the second object and outputted to the processing unit 35. As such, the processing unit 35 receives from the right light sensor module 33 the number (N1_1) of the sensing signals, and the number (N2_1) of the sensing signals, which are generated respectively by the second series (S2_1) of the light sensors 332, and receives from the left light sensor module 34 the number (N1_2) of the sensing signals, and the number (N2_2) of the sensing signals, which are generated respectively by the second series (S2_2) of the light sensors 342 of the left light sensor module 34. Similar to the first candidate index for each of the right and left light sensor modules 33, 34, the processing unit 35 further determines, for each of the right and left light sensor modules 33, 34, based on the number (N2_1, N2_2) of the sensing signals from a corresponding one of the right and left light sensor modules 33, 34, a second candidate index (Index$2_R$, Index$2_L$) that is associated with the indexes assigned respectively to the second series (S2_1, S2_2) of the light sensors 332, 342 of the corresponding one of the right and left light sensor modules 33, 34. Therefore, the processing unit 35 further obtains, from the look-up table stored in the memory 36, the angle information corresponding to the second candidate indexes (Index$2_R$, Index$2_L$) for the right and left light sensor modules 33, 34 and determines a position of the touch point (T2) of the second object in the touch area 312 based on the angle information obtained thereby. In this embodiment, the angle information obtained by the processing unit 35 further includes two tangent values (tan $\theta_{R\_2}$, tan $\theta_{L\_2}$) corresponding respectively to the second candidate indexes (Index$2_R$, Index$2_L$). Thus, the processing unit 35 determines the position of the touch point (T2) of the second object based on the tangent values (tan $\theta_{R\_2}$, tan $\theta_{L\_2}$), and the distance (D). Since the distance (D) is equal to a sum of an X-direction component ($X_{R\_2}$) of a distance between the touch point ($T_2$) of the second object and the axial center ($C_1$) of the guiding lens 333 of the right light sensor module 33, and an X-direction component ($X_{L\_2}$) of a distance between the touch point ($T_2$) of the second object and the axial center ($C_2$) of the guiding lens 343 of the left light sensor module 34, the processing unit 35 determines, based on the tangent values (tan $\theta_{R\_2}$, tan $\theta_{L\_2}$), the X-direction components ($X_{R\_2}$, $X_{L\_2}$) that can be represented by the following Expressions (8) and (9):

$$X_{R\_2} = \frac{\tan\theta_{L\_2} \times D}{\tan\theta_{R\_2} + \tan\theta_{L\_2}} \tag{8}$$

$$X_{L\_2} = D - X_{R\_2} \tag{9}$$

In addition, the processing unit 35 further determines, based on the tangent values (tan $\theta_{R\_2}$, tan $\theta_{L\_2}$) and the X-direction components ($X_{R\_2}$, $X_{L\_2}$), an average (Y2) of a Y-direction component ($Y_{R\_2}$) of the distance between the touch point ($T_2$) of the second object and the axial center ($C_1$) of the guiding lens 333 of the right light sensor module 33, and a Y-direction component ($Y_{L\_2}$) of the distance between the touch point ($T_2$) of the second object and the axial center ($C_2$) of the guiding lens 343 of the left light sensor module 34. The Y-direction components ($Y_{R\_2}$, $Y_{L\_2}$) and the average (Y2) can be represented respectively by the following Expressions (10), (11) and (12):

$$Y_{R\_2} = \tan\theta_{R\_2} \times X_{R\_2} \tag{10}$$

$$Y_{L\_2} = \tan\theta_{L\_2} \times X_{L\_2} \tag{11}$$

$$Y2 = \frac{Y_{R\_2} + Y_{L\_2}}{2} \tag{12}$$

Thus, the processing unit 35 can obtain an absolute two-dimensional coordinate ($X2_{touch}$, $Y2_{touch}$) of the position of the touch point ($T_2$) of the second object relative to the origin (O), wherein $X2_{touch}=X_{L\_2}-\Delta X$, and $Y2_{touch}=Y2-\Delta Y$.

It is noted that, in the example of FIG. 7, the number (N1_1) is greater than the number (N2_1) while the tangent value (tan $\theta_{R\_1}$) is greater than the tangent value (tan $\theta_{R\_2}$). At the same time, the number (N1_2) is less than the number (N2_2) while the tangent value (tan $\theta_{L\_1}$) is less than the tangent value (tan $\theta_{L\_2}$). As a result, generation of ghost points ($G_1$, $G_2$) can be avoided.

Figure 8:
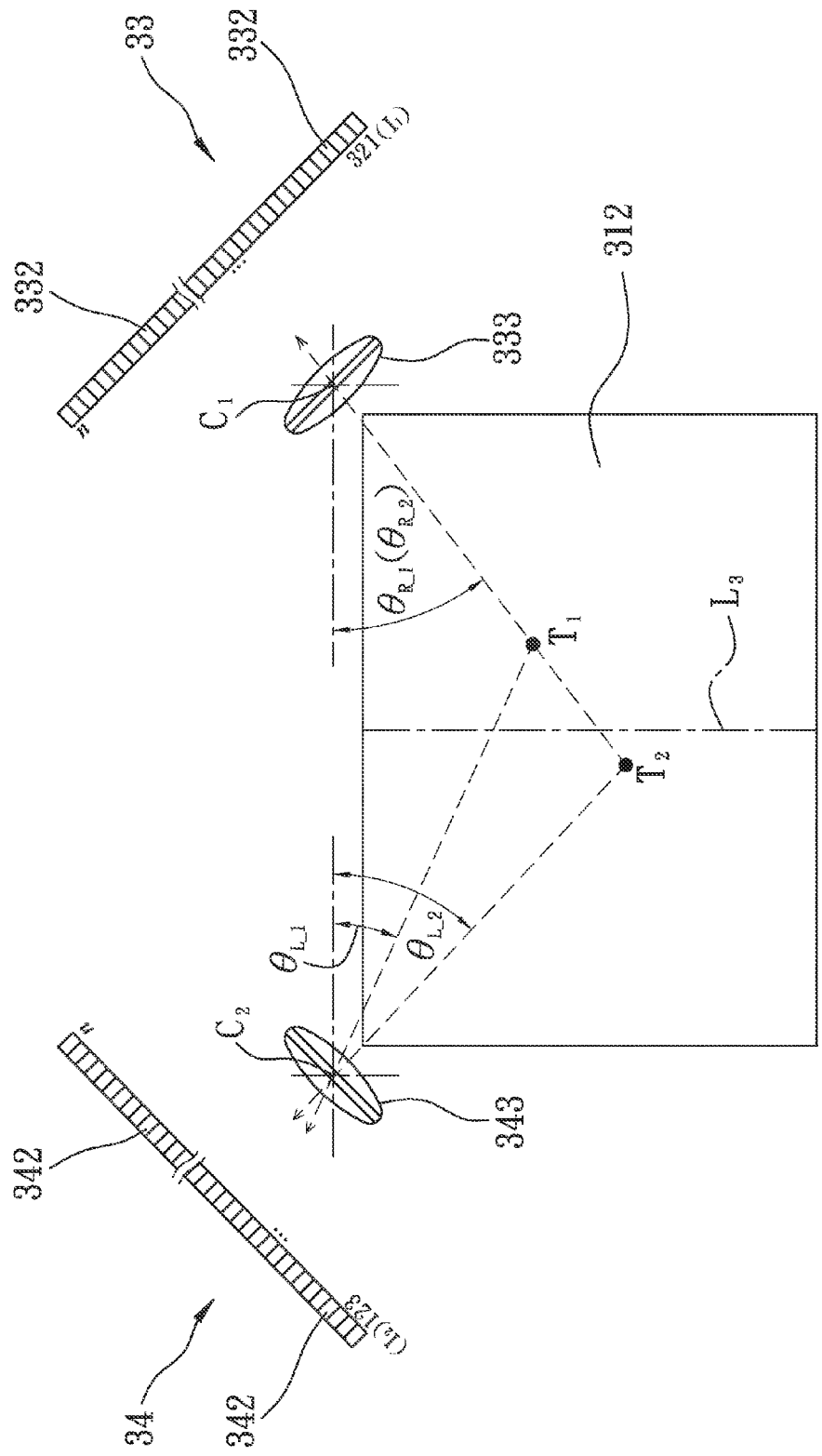
FIG. 8 is a schematic view illustrating another example of the preferred embodiment when in the two-touch operation.
Figure 9:
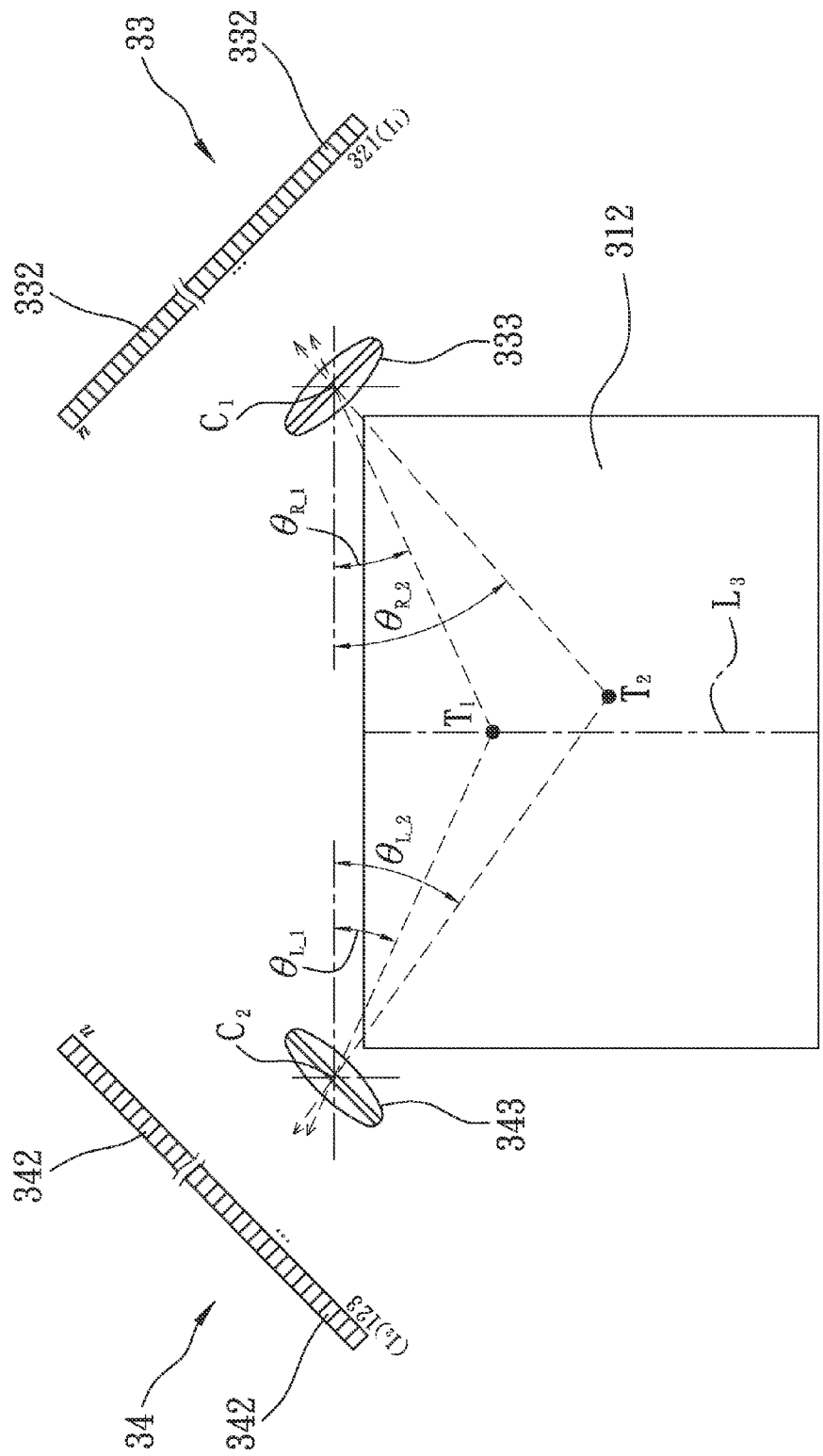
FIG. 9 is a schematic view illustrating a further example of the preferred embodiment when in the two-touch operation.

FIG. 8 illustrates another example of the preferred embodiment when in the two-touch operation. In this example, the first series (S1_1) of the light sensors 332 are identical to the second series (S2_1) of the light sensors 332 such that the number (N1_1) and the number (N2_1) are the same. Thus, the first and second candidate indexes (Index$1_R$, Index$2_R$) for the right light sensor module 33 are the same, and thus tan $\theta_{R\_1}$=tan $\theta_{R\_2}$. Therefore, it is indicated that the positions of the touch points ($T_1$, $T_2$) of the first and second objects, and the axial center ($C_1$) of the right light sensor module 33 are collinear, for the right light sensor module 33, FIG. 9 illustrates a further example of the preferred embodiment when in the two-touch operation. In this example, the number (N1_1) is greater than the number (N2_1) while the tangent value (tan $\theta_{R\_1}$) is less than the tangent value (tan $\theta_{R\_2}$). At the same time, the number (N1_2) is greater than the number (N2_2) while the tangent value (tan $\theta_{L\_1}$) is less than the tangent value (tan $\theta_{L\_2}$). In addition, since the first candidate indexes (Index$1_R$, Index$1_L$) for the right and left light sensor modules 33, 34 are the same, and thus tan $\theta_{R\_1}$=tan $\theta_{L\_1}$, it is indicated that the position of the touch point ($T_1$) of the first object is located on the vertical central line ($L_3$).

In sum, due to the presence of the look-up table, the optical touch device 3 of the present invention can easily locate one or two objects without complicated inverse trigonometric computation.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A locating method for an optical touch device, the optical touch device including a panel body having a side surface configured with a touch area, a number (I) of light sensor modules mounted on the side surface of panel body and disposed out of the touch area, and a processing unit connected electrically to the light sensor modules, each of the light sensor modules including an array of light sensors, each of which is operable to generate a sensing signal in response to a specific intensity of light sensed thereby, said locating method comprising the steps of:
   a) for each of the light sensor modules, assigning to each of the light sensors an index corresponding to angle information thereof;
   b) establishing a look-up table that includes the angle information corresponding to the indexes assigned respectively to the light sensors of the light sensor modules;
   c) when a first object contacts the touch area of the panel body, configuring the processing unit to determine, for each of the light sensor modules, based on a number (N1_i) of sensing signals from a corresponding one of the light sensor modules generated respectively by a first series (S1_i) of the light sensors of the corresponding one of the light sensor modules in response to sensing of light associated with the first object, a first candidate index that is associated with the indexes assigned respectively to the first series (S1_i) of the light sensors of the corresponding one of the light sensor modules, where i=1, . . . , I;
   d) configuring the processing unit to obtain, from the look-up table established in step b), the angle information corresponding to the first candidate indexes for the light sensor modules determined in step c); and
   e) configuring the processing unit to determine a position of a touch point the first object in the touch area of the panel body based on the angle information obtained in step d); wherein:
   in step c), when a second object contacts the touch area of the panel body simultaneously with the first object, the processing unit further determines, for each of the light sensor modules, based on a number (N2_i) of sensing signals from the corresponding one of the light sensor modules generated respectively by a second series (S2_i) of the light sensors of the corresponding one of the light sensor modules in response to light associated with the second object, a second candidate index that is associated with the indexes assigned respectively to the second series (S2_i) of the light sensors of the corresponding one of the light sensor modules;
   in step d), the processing unit further obtains, from the look-up table established in step b), the angle information corresponding to the second candidate indexes for the light sensor modules determined in step c);
   in step e), the processing unit further determines a position of a touch point of the second object in the touch area of the panel body based on the angle information obtained in step d);
   wherein, in step a), the indexes assigned respectively to the light sensors of each of the light sensor modules are consecutive integers; and
   in step c), when each of the numbers (N1_i, N2_i) is greater than one, for each of the light sensor modules, the processing unit determines an integral number equal to or closest to and greater than an average of the indexes assigned respectively to first and last ones of the first series (S1_i) of the light sensors as the first candidate index, and determines an integral number equal to or closest to and greater than an average of the indexes assigned respectively to first and last ones of the second series (S2_i) of the light sensors as the second candidate index.

2. The locating method as claimed in claim 1, wherein the look-up table includes a plurality of sub-tables corresponding respectively to the light sensor modules, each of the sub-tables including the angle information corresponding to the indexes assigned respectively to the light sensors of a respective one of the light sensor modules.

3. The locating method as claimed in claim 1, each of the light sensors of each of the light sensor modules being operable between an active state and a non-active state, wherein, in step c), for each of the light sensor modules, the first series (S1_i) of the light sensors and the second series (S2_i) of the light sensors are operated in the active state, and the remaining light sensors are operated in the non-active state.

4. The locating method as claimed in claim 1, the touch area being rectangular, I=2 such that one of the two light sensor modules serves as a right light sensor module disposed adjacent to an upper right corner of the touch area, and the other one of the two light sensor modules serves as a left light sensor module disposed adjacent to an upper left corner of the touch area, the right and left light sensor modules being symmetrical relative to a vertical central line ($L_3$) of the touch area, wherein:
   in step c), the processing unit receives from the right light sensor module the number (N1_1) of the sensing signals, which are generated respectively by the first series (S1_1) of the light sensors, and the number (N2_1) of the sensing signals, which are generated respectively by the second series (S2_1) of the light sensors, and receives from the left light sensor module the number (N1_2) of the sensing signals, which are generated respectively by the first series (S1_2) of the light sensors, and number (N2_2) of the sensing signals, which are generated respectively by the second series (S2_2) of the light sensors; and
   the angle information obtained in step d) includes two tangent values ($\tan \theta_{R\_1}$, $\tan \theta_{R\_2}$) corresponding respectively to the first and second candidate indexes for the right light sensor module, and two tangent values ($\tan \theta_{L\_1}$, $\tan \theta_{L\_2}$) corresponding respectively to the first and second candidate indexes for the left right sensor module.

5. The locating method as claimed in claim 4, each of the right and left light sensor modules further including a guiding lens with an axial center disposed so that a distance (D) is formed between the axial centers of the guiding lenses of the right and left light sensor modules, wherein, in step e), the position of the touch point of the first object is determined based on the tangent values ($\tan \theta_{R\_1}$, $\tan \theta_{L\_1}$) and the distance (D), and the position of the touch point of the second object is determined based on the tangent values ($\tan \theta_{R\_2}$, $\tan \theta_{L\_2}$) and the distance (D).

6. The locating method as claimed in claim 5, wherein step e) further includes the sub-steps of:

e-1) assuming that the distance (D) is equal to a sum of an X-direction component ($X_{R\_1}$) of a distance between the touch point of the first object and the axial center of the guiding lens of the right light sensor module, and an X-direction component ($X_{L\_1}$) of a distance between the touch point of the first object and the axial center of the guiding lens of the left light sensor module, and that the distance (D) is equal to a sum of an X-direction component ($X_{R\_2}$) of a distance between the touch point of the second object and the axial center of the guiding lens of the right light sensor module, and an X-direction component ($X_{L\_2}$) of a distance between the touch point of the second object and the axial center of the guiding lens of the left light sensor module;

e-2) determining the X-direction components ($X_{R\_1}$, $X_{L\_1}$, $X_{R\_2}$, $X_{L\_2}$) based on the tangent values ($\tan \theta_{R\_1}$, $\tan \theta_{R\_2}$), the tangent values ($\tan \theta_{L\_1}$, $\tan \theta_{L\_2}$), and the distance (D), using $$X_{R\_1} = \frac{\tan\theta_{L\_1} \times D}{\tan\theta_{R\_1} + \tan\theta_{L\_1}},$$

$X_{L\_1} = D - X_{R\_1}$, $$X_{R\_2} = \frac{\tan\theta_{L\_2} \times D}{\tan\theta_{R\_2} + \tan\theta_{L\_2}},$$

and $X_{L\_2} = D - X_{R\_2}$;

e-3) determining, based on the tangent values ($\tan \theta_{R\_1}$, $\tan \theta_{R\_2}$), the tangent values ($\tan \theta_{L\_1}$, $\tan \theta_{L\_2}$), and the X-direction components ($X_{R\_1}$, $X_{L\_1}$, $X_{R\_2}$, $X_{L\_2}$) determined in sub-step e-2), an average (Y1) of a Y-direction component ($Y_{R\_1}$) of the distance between the touch point of the first object and the axial center of the guiding lens of the right light sensor module, and a Y-direction component ($Y_{L\_1}$) of the distance between the touch point of the first object and the axial center of the guiding lens of the left light sensor module, and an average (Y2) of a Y-direction component ($Y_{R\_2}$) of the distance between the touch point of the second object and the axial center of the guiding lens of the right light sensor module, and a Y-direction component ($Y_{L\_2}$) of the distance between the touch point of the second object and the axial center of the guiding lens of the left light sensor module, using $Y_{R\_1} = \tan \theta_{R\_1} \times X_{R\_1}$, $Y_{L\_1} = \tan \theta_{L\_1} \times X_{L\_1}$, $$Y1 = \frac{Y_{R\_1} + Y_{L\_1}}{2},$$

$Y_{R\_2} = \tan \theta_{R\_2} \times X_{R\_2}$, $Y_{L\_2} = \tan \theta_{L\_2} \times X_{R\_2}$, and $$Y2 = \frac{Y_{R\_2} + Y_{L\_2}}{2}; \text{ and}$$

e-4) determining a related two-dimensional coordinate of the position of the touch point of each of the first and second objects in the touch area based on the X-direction components ($X_{L\_1}$, $X_{L\_2}$) determined in sub-step e-2), and the averages (Y1, Y2) determined in sub-step e-3).

7. The locating method as claimed in claim 5, wherein:

when the number (N1_1) and the number (N2_1) differ from each other while the number (N1_2) and the number (N2_2) differ from each other, if the number (N1_1) is greater than the number (N2_1) while the tangent value ($\tan \theta_{R\_1}$) is greater than the tangent value ($\tan \theta_{R\_2}$), the number (N1_2) is less than the number (N2_2) while the tangent value ($\tan \theta_{L\_1}$) is less than the tangent value ($\tan \theta_{L\_2}$), if the number (N1_1) is less than the number (N2_1) while the tangent value ($\tan \theta_{R\_1}$) is less than the tangent value ($\tan \theta_{R\_2}$), the number (N1_2) is greater than the number (N2_2) while the tangent value ($\tan \theta_{L\_1}$) is greater than the tangent value ($\tan \theta_{L\_2}$), if the number (N1_1) is greater than the number (N2_1) while the tangent value ($\tan \theta_{R\_1}$) is less than the tangent value ($\tan \theta_{R\_2}$), the number (N1_2) is greater than the number (N2_2) while the tangent value ($\tan \theta_{L\_1}$) is less than the tangent value ($\tan \theta_{L\_2}$), and if the number (N1_1) is less than the number (N2_1) while the tangent value ($\tan \theta_{R\_1}$) is greater than the tangent value ($\tan \theta_{R\_2}$), the number (N1_2) is less than the number (N2_2) while the tangent value ($\tan \theta_{L\_1}$) is greater than the tangent value ($\tan \theta_{L\_2}$);

when the first series (S1_1) of the light sensors of the right light sensor module are identical to the second series (S2_1) of the light sensors of the right light sensor module such that the number (N1_1) and the number (N2_1) are the same, the tangent value ($\tan \theta_{R\_1}$) is equal the tangent value ($\tan \theta_{R\_2}$); and when the first series (S1_2) of the light sensors of the left light sensor module are identical to the second series (S2_2) of the light sensors of the left light sensor module such that the number (N1_2) and the number (N2_2) are the same, the tangent value ($\tan \theta_{L\_1}$) is equal the tangent value ($\tan \theta_{L\_2}$).

8. An optical touch device comprising:

a panel body having a side surface configured with a touch area, and a peripheral area surrounding said touch area;

a number (I) of light sensor modules mounted to said peripheral area of said side surface of said panel body, each of said light sensor modules including an array of light sensors, each of said array of light sensors of each of said light sensor modules being assigned with an index corresponding to angle information thereof, and being operable to generate a sensing signal in response to a specific intensity of light sensed thereby;

a memory for storing a look-up table that includes the angle information corresponding to the indexes assigned respectively to said light sensors of said light sensor modules; and a processing unit connected electrically to said light sensor modules and said memory;

wherein, when a first object contacts said touch area of said panel body, for each of said light sensor modules, a first series (S1_i) of said light sensors generate respectively a number (N1_i) of sensing signals in response to sensing of light associated with the first object, and output the number (N1_i) of the sensing signals to said processing unit such that said processing unit is operable to determine, for each of said light sensor modules, based on the number (N1_i) of the sensing signals from a corresponding one of said light sensor modules, a first candidate index that is associated with the indexes assigned respectively to the first series (S1_i) of said light sensors of the corresponding one of said light sensor modules, where i=1, . . . , I; and wherein said processing unit is operable to obtain, from the look-up table stored in said memory, the angle information corresponding to the first candidate indexes for said light sensor modules and to determine a position of a touch point of the first object in said touch area of said panel body based on the angle information obtained thereby;

wherein, when a second object contacts said touch area of said panel body simultaneously with the first object:

for each of said light sensor modules, a second series (S2_i) of said light sensors generate a number (N2_i) of sensing signals in response to sensing of light associated with the second object, and output the number (N2_i) of the sensing signals to said processing unit;

said processing unit further determines, for each of said light sensor modules, based on the number (N2_i) of the sensing signals from the corresponding one of the light sensor modules, a second candidate index that is associated with the indexes assigned respectively to the second series (S2_i) of the light sensors of the corresponding one of the light sensor modules;

said processing unit further obtains, from the look-up table stored in said memory, the angle information corresponding to the second candidate indexes for said light sensor modules, and determines a position of a touch point of the second object in said touch area of said panel body based on the angle information obtained thereby.

9. The optical touch device as claimed in claim 8, wherein the look-up table stored in said memory includes a plurality of sub-tables corresponding respectively to said light sensor modules, each of the sub-tables including the angle information corresponding respectively to the indexes assigned to said light sensors of a respective one of said light sensor modules.

10. The optical touch device as claimed in claim 8, wherein:

each of said light sensors of each of said light sensor modules is operable between an active state and a non-active state;

for each of said light sensor modules, the first series (S1_i) of said light sensors and the second series (S2_i) of said light sensors are operated in the active state, and the remaining said light sensors are operated in the non-active state.

11. The optical touch device as claimed in claim 8, wherein:

the indexes assigned respectively to said light sensors of each of said light sensor modules are consecutive integers; and when each of the numbers (N1_i, N2_i) is greater than one, for each of said light sensor modules, said processing unit determines an integral number equal to or closest to and greater than an average of the indexes assigned respectively to first and last ones of the first series (S1_i) of the light sensors as the first candidate index, and determines an integral number equal to or closest to and greater than an average of the indexes assigned respectively to first and last ones of the second series (S2_i) of said light sensors as the second candidate index.

12. The optical touch device as claimed in claim 8, wherein:

said touch area of said panel body is rectangular;

I=2 such that one of the two light sensor modules serves as a right light sensor module disposed adjacent to an upper right corner of the touch area, and the other one of the two light sensor modules serves as a left light sensor module disposed adjacent to an upper left corner of the touch area, the right and left light sensor modules being symmetrical relative to a vertical central line ($L_3$) of the touch area;

said processing unit receives from the right light sensor module the number (N1_1) of the sensing signals, which are generated respectively by the first series (S1_1) of the light sensors, and the number (N2_1) of the sensing signals, which are generated respectively by the second series (S2_1) of the light sensors, and receives from the left light sensor module the number (N1_2) of the sensing signals, which are generated respectively by the first series (S1_2) of the light sensors, and number (N2_2) of the sensing signals, which are generated respectively by the second series (S2_2) of the light sensors; and the angle information obtained by said processing unit includes two tangent values ($\tan \theta_{R\_1}$, $\tan \theta_{R\_2}$) corresponding respectively to the first and second candidate indexes for said right light sensor module, and two tangent values ($\tan \theta_{L\_1}$, $\tan \theta_{L\_2}$) corresponding respectively to the first and second candidate indexes for said left right sensor module.

13. The optical touch device as claimed in claim 12, wherein:

each of said right and left light sensor modules further includes a casing configured with a receiving space for receiving said light sensors such that the array of said light sensors are arranged along a first axial line ($L_{1\_R}$, $L_{1\_L}$) and are symmetrical relative to a second axial line ($L_{2\_R}$, $L_{2\_L}$) orthogonal to the first axial line ($L_{1\_R}$, $L_{1\_L}$), said casing being formed with an opening in spatial communication with said receiving space, and a guiding lens disposed parallel to the array of said light sensors and adjacent to said opening in said casing, said guiding lens having an axial center located on the second axial line ($L_{2\_R}$, $L_{2\_L}$) such that a distance (D) is formed between said axial centers of said guiding lenses of said right and left light sensor modules, such that the second axial lines ($L_{2\_R}$, $L_{2\_L}$) for said right and left light sensor modules are orthogonal to each other, and the second axial lines ($L_{2\_R}$, $L_{2\_L}$) and the vertical central line ($L_3$) intersect at one point; and said processing unit determines the position of the touch point of the first object based on the tangent values ($\tan \theta_{R\_1}$, $\tan \theta_{L\_1}$) and the distance (D), and determines the position of the touch point of the second object based on the tangent values ($\tan \theta_{R\_2}$, $\tan \theta_{L\_2}$) and the distance (D).

14. The optical touch device as claimed in claim 13, wherein:

the distance (D) is equal to a sum of an X-direction component ($X_{R\_1}$) of a distance between the touch point of the first object and said axial center of said guiding lens of said right light sensor module, and an X-direction component ($X_{L\_1}$) of a distance between the touch point of the first object and said axial center of said guiding lens of said left light sensor module, and is equal to a sum of an X-direction component ($X_{R\_2}$) of a distance between the touch point of the second object and said axial center of said guiding lens of said right light sensor module, and an X-direction component ($X_{L\_2}$) of a distance between the touch point of the second object and said axial center of said guiding lens of said left light sensor module;

said processing unit determines the X-direction components ($X_{R\_1}$, $X_{L\_1}$, $X_{R\_2}$, $X_{L\_2}$) based on the tangent values ($\tan\theta_{R\_1}$, $\tan\theta_{R\_2}$), the tangent values ($\tan\theta_{L\_1}$, $\tan\theta_{L\_2}$), and the distance (D), using $$X_{R\_1} = \frac{\tan\theta_{L\_1} \times D}{\tan\theta_{R\_1} + \tan\theta_{L\_1}},$$

$X_{L\_1} = D - X_{R\_1}$, $$X_{R\_2} = \frac{\tan\theta_{L\_2} \times D}{\tan\theta_{R\_2} + \tan\theta_{L\_2}},$$

and $X_{L\_2} = D - X_{R\_2}$;

said processing unit determines, based on the tangent values ($\tan\theta_{R\_1}$, $\tan\theta_{R\_2}$), the tangent values ($\tan\theta_{L\_1}$, $\tan\theta_{L\_2}$), and the X-direction components ($X_{R\_1}$, $X_{L\_1}$, $X_{R\_2}$, $X_{L\_2}$), an average (Y1) of a Y-direction component ($Y_{R\_1}$) of the distance between the touch point of the first object and said axial center of said guiding lens of said right light sensor module, and a Y-direction component ($Y_{L\_1}$) of the distance between the touch point of the first object and said axial center of said guiding lens of said left light sensor module, and an average (Y2) of a Y-direction component ($Y_{R\_2}$) of the distance between the touch point of the second object and said axial center of said guiding lens of said right light sensor module, and a Y-direction component ($Y_{L\_2}$) of the distance between the touch point of the second object and said axial center of said guiding lens of said left light sensor module, using $Y_{R\_1} = \tan\theta_{R\_1} \times X_{R\_1}$, $Y_{L\_1} = \tan\theta_{L\_1} \times X_{L\_1}$, $$Y1 = \frac{Y_{R\_1} + Y_{L\_1}}{2},$$

$Y_{R\_2} = \tan\theta_{R\_2} \times X_{R\_2}$, $Y_{L\_2} = \tan\theta_{L\_2} \times X_{R\_2}$, and $$Y2 = \frac{Y_{R\_2} + Y_{L\_2}}{2}; \text{ and}$$

said processing unit determines a related two-dimensional coordinate of the position of the touch point of each of the first and second objects in said touch area based on the X-direction components ($X_{L\_1}$, $X_{L\_2}$) and the averages (Y1, Y2).

15. The optical touch device as claimed in claim 13, further comprising a light generating unit mounted to said peripheral area of said side surface of said panel body for generating light that propagates along said side surface of said panel body and enters into said touch area of said panel body and that is intercepted and guided by each of the first and second objects to thus produce first and second reflected lights that pass respectively through said guiding lenses of said right and left light sensor modules via said openings in said casings of said right and left light sensor modules and toward the arrays of said light sensors of said right and left light sensor modules.

16. The optical touch device as claimed in claim 13, wherein:

when the number (N1_1) and the number (N2_1) differ from each other while the number (N1_2) and the number (N2_2) differ from each other, if the number (N1_1) is greater than the number (N2_1) while the tangent value ($\tan\theta_{R\_1}$) is greater than the tangent value ($\tan\theta_{R\_2}$), the number (N1_2) is less than the number (N2_2) while the tangent value ($\tan\theta_{L\_1}$) is less than the tangent value ($\tan\theta_{L\_2}$), if the number (N1_1) is less than the number (N2_1) while the tangent value ($\tan\theta_{R\_1}$) is less than the tangent value ($\tan\theta_{R\_2}$), the number (N1_2) is greater than the number (N2_2) while the tangent value ($\tan\theta_{L\_1}$) is greater than the tangent value ($\tan\theta_{L\_2}$), if the number (N1_1) is greater than the number (N2_1) while the tangent value ($\tan\theta_{R\_1}$) is less than the tangent value ($\tan\theta_{R\_2}$), the number (N1_2) is greater than the number (N2_2) while the tangent value ($\tan\theta_{L\_1}$) is less than the tangent value ($\tan\theta_{L\_2}$), and if the number (N1_1) is less than the number (N2_1) while the tangent value ($\tan\theta_{R\_1}$) is greater than the tangent value ($\tan\theta_{R\_2}$), the number (N1_2) is less than the number (N2_2) while the tangent value ($\tan\theta_{L\_1}$) is greater than the tangent value ($\tan\theta_{L\_2}$);

when the first series (S1_1) of said light sensors of said right light sensor module are identical to the second series (S2_1) of said light sensors of said right light sensor module such that the number (N1_1) and the number (N2_1) are the same, the tangent value ($\tan\theta_{R\_1}$) is equal the tangent value ($\tan\theta_{R\_2}$); and when the first series (S1_2) of said light sensors of said left light sensor module are identical to the second series (S2_2) of said light sensors of said left light sensor module such that the number (N1_2) and the number (N2_2) are the same, the tangent value ($\tan\theta_{L\_1}$) is equal the tangent value ($\tan\theta_{L\_2}$).

* * * * *